3,496,355
IMAGING METHOD WHEREIN A LATENT HEAT IMAGE IS DEVELOPED BY THE UNIFORM APPLICATION OF MECHANICAL FORCE
Richard Eric Nanfeldt, Yonkers, N.Y., assignor to Keuffel & Esser Company, Hoboken, N.J., a corporation of New Jersey
No Drawing. Filed Jan. 13, 1966, Ser. No. 520,379
Int. Cl. G01n 21/34, 23/04
U.S. Cl. 250—65     13 Claims

ABSTRACT OF THE DISCLOSURE

Visible images are prepared by heat imaging a layer of material comprising a thermoplastic resin and a semi-compatible modifier therefor to form a latent image in the layer and subsequently applying a uniform mechanical force to the layer to effect a difference in opacity between the heat-imaged and unimaged areas, thereby providing a visibly distinct image.

---

This invention relates to the formation and development of images and, more particularly, relates to methods of forming latent heat images in thermoplastic films and the development of such images utilizing mechanical forces.

In United States Patent No. 3,206,601, issued Sept. 14, 1965, there is disclosed a method of forming latent heat images on thermoplastic resins using thermographic techniques and the development of such images using techniques based on the difference of certain properties in the latent image areas and the non-latent image areas. According to the patent, heat is applied in blanketwise imagewise fashion to a thermoplastic layer, using contact or reflex techniques. The source of heat is a warm body or infrared radiation with development being affected with coloring materials, such as a powder, solution or the like.

The present invention provides an improvement upon the aforementioned method and further provides a process for image reproduction which is independent of the addition of developing agents such as powders, solutions, and the like.

Accordingly, it is an object of the present invention to provide a novel method of image reproduction. A further object of the invention is to provide a method of creating a visible image using thermal energy.

Another object of the invention is to provide a method of forming latent images and the development of such images using mechanical force.

Still another object of the invention is to provide a method of forming latent images in a modified thermoplastic material and the development of such images using mechanical force.

Yet another object of this invention is to provide a method of forming latent heat images in a modified thermoplastic material and the development of such images using mechanical force.

Other objects of the present invention will become apparent from the following description.

In accordance with the present invention, a latent heat image is created in a layer comprising a thermoplastic polymer and a modifier therefor. Included within the term layer are free films or coatings on a suitable support.

Depending upon the desired end result and the polymer utilized in forming the layer, as more fully hereinafter described, the polymer may be oriented or unoriented. Thickness of the layer is generally not important. Layer thicknesses of 1 to 15 mils have been satisfactorily used. The layer prior to creating the heat image may be transparent or translucent. The thermoplastic polymers contemplated include polyvinyl chloride, polyvinyl chloride-acetate, polystyrene, polypropylene, acrylic ester, and the like.

The modifiers contemplated by this invention are those which have limited compatibility with the polymer. Thus, the layer of this invention is a mixture which forms a composition which is analogous to the solid solution obtained when certain metals are mixed. This partial or semi-compatibility does not substantially effect the transparency or translucency of the layer when the amount of modifier is maintained within practical limits in the mixture. Suitable modifiers include montan wax, butyl isobutyl methacrylate, butadiene styrene, acrylonitrile butadiene styrene, alkyl acrylate, polyisobutylene and the like depending upon the polymer. Generally, the ratio of the modifier to thermoplastic polymer is from about 2% to about 20% by weight.

Compositions useful as the image producing layers of the invention may be readily prepared by solution blending of the selected polymer and semi-compatible modifier therefor. Proportions used will depend upon the nature of the specific materials selected and may be readily determined by routine laboratory methods. Useful blends of the selected materials are those which produce a layer of thermoplastic composition which is initially substantially transparent or translucent at normal temperatures, that is, at a temperature at or slightly above room temperature.

Such a layer should additionally be of such a composition of polymer and modifier that a mechanical force uniformly applied to the layer initially at ordinary temperature will cause the layer to become opaque. While this phenomenon is not entirely understood, it is likely that the applied stress, such as from bending the layer, upsets the limited compatibility between the polymer and admixed modifier and results in a sepaartion of the two materials in a manner not unlike the phenomenon of "blushing."

A layer thus properly composed may be used in the present novel imaging method which makes use of the present discovery that heating of the layer to a sufficient temperature will prevent subsequent opaquing of the layer under applied mechanical stress. Since the useful blends of a selected polymer and modifier therefor may vary within a substantial range of proportions, useful temperatures, which are apparently a function of such proportions, may likewise vary within a substantial range. Such temperature ranges may be readily determined routinely as in the case of the preparation of useful blend proportions. It has been found, however that temperatures occasioned by thermographic copying devices are generally sufficient for use with most of the layer compositions abovenoted.

The difference in behavior of heated and non-heated areas of a layer as described above when placed under mechanical stress is generally utilized in the present invention by selectively heating portions of the layer, as in an image-wise manner, in order to render the layer insensitive in such heated areas to the opaquing effect of applied force.

In accordance with the invention, therefore, a pattern of relatively permanent transparency is established in the layer by application of heat and a pattern of contrasting opacity is established in the same layer by application of force in order to render the heat pattern visible. The sequence of these manipulations is not critical and may be varied as desired. Thus a layer having a normally low degree of opacity, e.g. a transparent layer, may be heat imaged and subsequently mechanically stressed to render the remaining areas opaque, or alternatively a normally translucent or mechanically opaqued layer may be selectively transparentized by heat imaging.

Areas of heat-imaged transparency may be utilized with respect to that property alone, for example, in the preparation of projection transparencies, or when the layer is borne on a support having a surface color contrasting with the opaque state of the layer, direct reading sheets may be obtained.

The latent heat image may be created by imagewise infrared indicia thermographics or by a heated stylus or stamp. For instance, graphic intelligence on a master is reproduced on the thermoplastic layer by placing the master in heat-conductive relationship to the master and exposing the master and layer to infrared radiation to form in the layer a heat-created latent image corresponding to the master image, and by developing the latent heat image using mechanical force as hereinafter more fully described. A master normally comprises a support substantially transparent to infrared radiation with infrared absorbing indicia or material disposed imagewise on the support. The infrared absorbing indicia converts the infrared radiation into a heat image which is conducted to the layer to produce the latent heat image.

The latent heat image may be formed by using contact or reflex exposure techniques. The terms "contact" and "reflex" are used in the same context as in the photographic arts, i.e. the manner in which an assembly is exposed to actinic radiation, or infrared radiation, as contemplated by this invention. In the contact exposure technique, the infrared radiation is directed through the master to the layer, whereas in the reflex exposure technique, the infrared radiation is directed through the layer to the master.

The latent heat image may also be formed with a heated stylus or stamp, or by heat conducted through an insulating stencil, or by a laser beam. Using a heated stylus or the like, the temperature of the stylus is maintained at a temperature above the second order transition point of the layer. The maximum temperature of the stylus should be below the deformation temperature of the layer, i.e. a temperature above which deformation of the layer will occur. Additionally, when using a stylus it is desirable to place the layer on a relatively hard surface to minimize deformation of the layer. Using a laser beam, the master must be formed of a material which will absorb the heat energy.

The latent heat images formed in the layer are developed by uniformly applying to the layer a mechanical force, such as by stretching, bending or flexing the layer. The latent images may become visible by the non-image area remaining clear with the image area becoming opaque. Utilizing a translucent layer, the image may become visible by the non-image areas remaining opaque and the image areas becoming clear, or the image may become visible by the non-image areas becoming clear and the image areas becoming opaque.

In another embodiment of the invention, a mechanical force may be first applied to the layer whereby the layer becomes opaque. The subsequent application of heat imagewise will form a direct print out. Heating the layer evenly at low temperatures will cause the layer to become transparent. However, the image may be made visible by subjecting the layer to a mechanical force.

The concept of this invention can be utilized in arcane writing, graphic displays, transparencies for projection, overhead projection systems, cartography, and the like. A distinct advantage of the invention is the ability to provide additional information at a later date since a heat-applied image will remain effective for a considerable length of time. For certain applications, the layer may include a pigment or a dye. The amount of pigment or dye added to the polymer and modifier during formulation should be carefully controlled so as not to cloud the image when developing the latent heat image using a mechanical force.

A fuller understanding may be had by referring to the following examples which are not intended to limit in any manner the scope of the invention.

Example I

A polyvinyl chloride-acetate film containing 6.5% of an alkyl acrylate impact resin modifier was placed in contact with a master and subjected to infrared indicia thermography to form a latent heat image. The heated film was stressed in an Instron tensile tester whereupon the non-image areas turned opaque while the image areas remained transparent. A similar result was obtained by flexing the film by hand.

Example II

A polyvinyl chloride-acetate film containing 8.0% of an alkyl acrylate impact modifier was processed in a manner similar to Example I with similar results being obtained.

Example III

Polyvinyl chloride coating modified with acrylonitrile butadiene styrene was processed in a manner similar to the film of Example I with like results.

Example IV

An unoriented polyvinyl chloride-acetate film having a montan wax modifier was exposed in a direct heat-conductive relationship with an infrared absorbing master. A faint, frosted image on a transparent background was produced. This image was developed by stressing in an Instron tensile tester and produced a relatively opaque image on a transparent background. Abrasion, bending or stretching also developed the image. Utilizing an oriented film also produced favorable results.

Example V

A polyvinyl chloride-acetate film having an alkyl acrylate modifier was subjected to heat imagewise to form a latent heat image. The latent heat image could not be made visible by dyeing or by viewing with crossed optical polarizers. When the film was stretched, the non-imaged areas became opaque, while the image areas remained transparent. By continued stretching, the image areas eventually became opaque.

While the invention has been described with reference to particular materials and procedures, it is obvious that changes and modifications can be made without departing from the spirit or scope of the invention.

What is claimed is:

1. A method of forming a visible image which comprises:
    (a) providing a layer comprising a thermoplastic polymer and a semi-compatible modifier therefor, said layer having a first degree of opacity;
    (b) selectively heating an area of said layer to create a latent image therein corresponding to said heated area; and
    (c) applying a mechanical force uniformly to said layer to create in an area thereof a second degree of opacity visibly distinct from said first degree of opacity, the respective areas of said layer having said first and second degrees of opacity being defined according to said latent image.

2. The method of claim 1 wherein the visible image formed consists of an area of said first degree of opacity corresponding to said latent image.

3. The method of claim 1 wherein the visible image formed consists of an area of said second degree of opacity corresponding to said latent image.

4. The method of claim 1 wherein said mechanical force is applied by bending said layer.

5. The method of claim 1 wherein said mechanical force is applied by stretching said layer.

6. The method of claim 1 wherein said mechanical force is applied by abrading said layer.

7. The method according to claim 1 wherein said heating is accomplished by conductive means.

8. The method according to claim 1 wherein said heating is accomplished by radiant means.

9. The method of claim 1 wherein said heating is accomplished by means of infrared indicia thermography.

10. The method of claim 1 wherein said modifier is present in said layer in an amount of from 2% to 20% by weight of said thermoplastic polymer.

11. The method of claim 1 wherein said layer is a self-supporting film.

12. The method of claim 1 wherein said layer is a coating on a support.

13. The method of claim 12 wherein said layer is transparent in its first degree of opacity, and wherein the coated surface of said support is of a color visibly distinct from said second degree of opacity.

References Cited

UNITED STATES PATENTS 3,240,932   3/1966   Haines _____ 250—65 X

WILLIAM F. LINDQUIST, Primary Examiner